Patented Feb. 28, 1928.

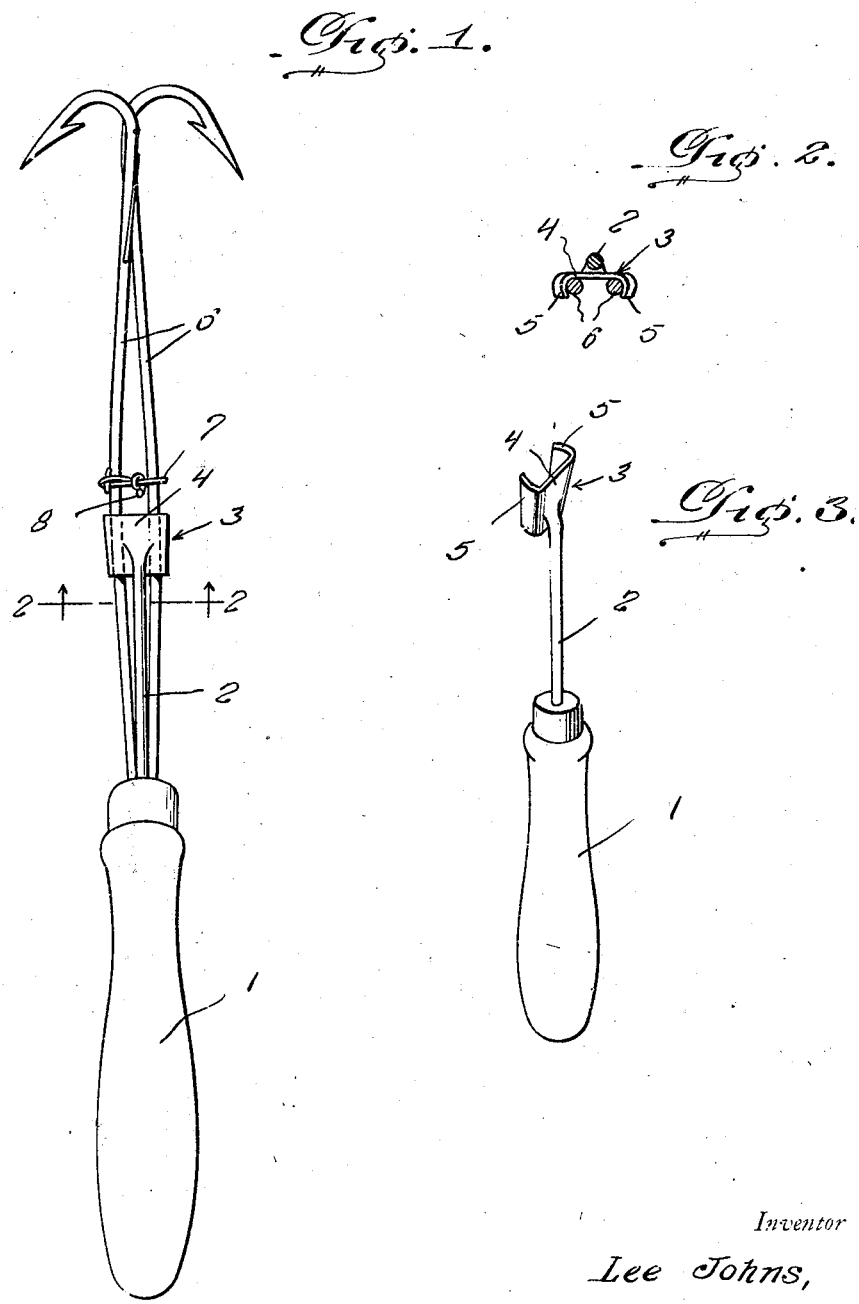

1,660,617

UNITED STATES PATENT OFFICE.

LEE JOHNS, OF MIAMI, FLORIDA.

TOOL FOR FACILITATING BAITING OF TRAP HOOKS.

Application filed December 6, 1926. Serial No. 152,915.

This invention relates to a tool adapted for use to facilitate the setting and baiting of trap hooks, and the like.

An object of the invention resides in providing a tool with a suitable member adapted to receive a pair of spring arms on a trap hook for retaining and locking the same in set position, so that the bait holder and latch may be properly set to hold the arms in such set position and the bait conveniently applied to the bait holder and latch without the accidental release of the hook from the set position.

This invention overcomes considerable difficulty in fishing with trap hooks, occasioned in the setting and baiting the hooks, which are frequently and accidentally released, resulting in injury due to the operation of the hooks to the fisherman, or person setting the same, in addition to causing considerable loss and time in the setting and baiting of the hook.

The invention comprehends numerous other objects residing in the specific construction of the holder or tool, which are more particularly pointed out in the following description, and in the claim directed to the preferred form of construction, it being understood however, that various changes in the size, shape and relation of the parts may be made without departing from the spirit and scope of the invention as hereinafter set forth.

In the drawings forming part of this application:—

Figure 1 is an elevational view showing the tool applied to a trap hook, for holding the same in set position, so that the hook may be baited and set.

Fig. 2 is a sectional view taken on the line 2—2 of Fig. 1.

Fig. 3 is a perspective of the tool.

This tool includes a handle 1 in which is suitably fastened the rod or shank 2, provided at the end portions with the head or holding member 3.

This head 3 is formed of a plate member having a substantially flat central portion 4, and laterally extending inwardly curved edges 5 which diverge from the end adjacent the shank 2 toward the outer end.

In fishing with trap hooks provided with resilient arms as illustrated in Fig. 1 at 6, normally adapted to be moved outwardly in angular relation for catching a fish, considerable difficulty is experienced in setting these hooks under tension in adjacent relation as shown in Fig. 1, and baiting the hooks preparatory to use. This difficulty is occasioned by the sensitive latching means which forms the bait holder in being set and the bait being applied thereto in the set position.

In practice, it is found that the latch frequently slips in being set, and the hooks released which frequently injure the operator or fisherman. The improved tool of this invention is adapted for use in securely holding the arms of the hooks in tensioned relation so that the bait may be applied to the bait holder and latch, and the same properly set following which the set hook is released from the holder, in such a manner that it will not injure the operator or fisherman in the event it accidentally becomes released in removing the holder.

In using this tool, the arms 6 of the hook are pressed together to the position shown in Fig. 1, and the head 3 of the tool applied to these arms as shown in the drawing, in which the arms 6 are retained in the head by the curved extensions 5 as shown in Fig. 2. The tool is forced longitudinally from the pivot portion and connection between the arms downwardly to the central portion adjacent to the bait holder and latch. This position is clearly shown in Fig. 1, at which time the latch 7 may be readily set to hold the arm 6 in tensioned relation, and the bait applied thereto without danger of the accidental operation of the arm.

After the bait is applied to the bait holding extension 8 on the latch 7, and the latch properly set following application of the bait, the hook is then held at the pivot portion under the handle 1, as shown in Fig. 1 and the head 3 drawn toward this pivot portion which will remove it from the arms 6.

This is due to the fact that the width of the plate portion 4 is greater than the distance between the arm at the connection therebetween, so that as it is moved toward the end of the arm, as above stated, it will become gradually released from engagement therewith.

It will be seen that should the latch 7 accidentally trip and permit operation of the hook, it will not be likely to damage the fisherman who will hold the hooked end away from him in removing the head 3 of the tool after the setting and baiting operation.

It should thus be clearly appreciated that a simple and yet highly useful tool has been provided which is particularly designed for use in the setting and baiting of trap hooks, and particularly those used in fishing for large fish such as tarpon and seal fish.

Having thus described my invention, what I claim as new is:—

A tool for facilitating the setting of trap hooks comprising a rod member, a handle mounted on one end of the rod member, and a sheet metal plate having the central portion secured to the opposite end of said rod member, said plate having the opposite side portions formed to provide a pair of lateral oppositely curved extensions in relative angular relation, and adapted to embrace and retain the spring arms of a fish hook in adjacent set position.

In testimony whereof I affix my signature.

LEE JOHNS.